(12) United States Patent
Smith et al.

(10) Patent No.: US 9,255,825 B1
(45) Date of Patent: Feb. 9, 2016

(54) SELF-ALIGNING WAFER-STYLE PROCESS INSTRUMENT

(71) Applicant: Rosemount Inc., Chanhassen, MN (US)

(72) Inventors: Joseph Alan Smith, Minneapolis, MN (US); Steven Bruce Rogers, Minnetonka, MN (US); Jesse Christopher Pettit, Minneapolis, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 14/502,778

(22) Filed: Sep. 30, 2014

(51) Int. Cl.
*G01F 1/58* (2006.01)

(52) U.S. Cl.
CPC ..................... *G01F 1/584* (2013.01)

(58) Field of Classification Search
USPC .......... 73/861.355–861.357, 861.121, 861.08
See application file for complete search history.

(56) References Cited

U.S. PATENT DOCUMENTS

| | | | |
|---|---|---|---|
| 4,181,018 A | 1/1980 | Schmoock | |
| 4,345,464 A | 8/1982 | Herzl et al. | |
| 4,986,574 A | 1/1991 | Beckman | |
| 5,361,797 A | 11/1994 | Crow et al. | |
| 5,479,957 A | 1/1996 | Crow et al. | |
| 5,632,632 A | 5/1997 | Huotari | |
| 5,814,738 A | 9/1998 | Pinkerton et al. | |
| 6,782,764 B2 | 8/2004 | Osawa | |
| 7,284,450 B2 | 10/2007 | Orleskie et al. | |
| 7,578,202 B2 * | 8/2009 | Huybrechts | G01F 1/58 73/861.12 |
| 7,591,192 B2 * | 9/2009 | Williams | F16L 137/597 137/597 |
| 7,845,688 B2 * | 12/2010 | Gallagher | F16L 9/147 138/44 |
| 8,739,638 B1 * | 6/2014 | England | G01F 1/40 73/861.52 |
| 9,021,890 B2 * | 5/2015 | Rogers | G01F 1/584 73/861.12 |
| 9,032,815 B2 * | 5/2015 | Noui-Mehidi | G01F 1/3218 73/861.22 |
| 2008/0245158 A1 | 10/2008 | Hedtke | |
| 2009/0188327 A1 | 7/2009 | Shanahan et al. | |
| 2013/0006544 A1 | 1/2013 | Rovner | |

* cited by examiner

*Primary Examiner* — Jewel V Thompson
(74) *Attorney, Agent, or Firm* — Kinney & Lange, P.A.

(57) ABSTRACT

A process instrument having a wafer-style body for mounting between an upstream flanged pipe and a downstream flanged pipe has a flow passage, a transmitter connected to the body, and first and second end plates fixed to the body. The first end plate has a first set of cams for engaging a plurality of threaded fasteners extending between the upstream flanged pipe and the downstream flanged pipe. The second end plate has a second set of cams for engaging the plurality of threaded fasteners such that the first set of cams and the second set of cams center the flow passage with respect to the upstream flanged pipe and the downstream flanged pipe.

15 Claims, 10 Drawing Sheets

SELF-ALIGNING WAFER-STYLE PROCESS INSTRUMENT

BACKGROUND

The present invention relates generally to fluid processing and, more particularly, to process instruments. Specifically, the invention concerns the alignment of wafer-style devices installed in a flow line.

Process instruments are used in a wide range of fluid handling systems. While the present invention will be described in the context of a flow measurement device, it is to be understood that the invention could be applied to other types of wafer-style process instruments. Flow measurement devices are used to monitor and control the flow rate or quantity of process flow within a conduit and come in many varieties, including positive displacement and magnetic flow meters, suited for use in numerous applications. The different types of meters employ technology based on the system in which they are installed. For example, a magnetic flow meter is advantageous when the use of moving parts within a flow line is not ideal or practical. While the present invention will be described in the context of a magnetic flow meter, it is to be understood that the invention could be applied to other types of flow meters.

Standard flow meters are interposed between upstream and downstream pipes, each pipe having an end flange. In order to secure the device between the pipes, traditional flow meters are equipped with a flange on each end, each flange having a circle of bolt holes that aligns with bolt holes on the end flanges of the pipes. While flow meter flanges ensure the flow passage of the meter is centered with respect to the flow passage of the conduit, flanged flow meters are relatively large and expensive. Moreover, there a number of possible bolt hole patterns in existing flanged pipelines, requiring flanged flow meters to have distinct bolt hole circles. One solution to reduce cost and simplify installation is to remove the flanges from the flow meter body. While flangeless, or wafer-style, flow meters save money and time, without bolt hole circles on the flanges, these meters can suffer from misalignment issues giving rise to local turbulence and inaccurate meter readings.

Current methods of resolving flow meter alignment issues include providing camming devices positioned between the pipe flanges and the flow meter body during the installation process. Such devices take advantage of existing hardware used to bridge the gap between the upstream and downstream pipes. By rotating camming devices with respect to the flow meter body, the bolts are forced to their extreme positions within the bolt holes, thus ensuring the flow passage of the meter is centered with respect to the flow line. Examples of existing alignment devices are disclosed in U.S. Pat. No. 4,345,464 and U.S. Pat. No. 5,632,632. While these devices can be used to center wafer-style flow meters installed in flanged pipelines having a variety of bolt hole patterns, the additional hardware is problematic both from a production and installation standpoint. Not only is the added equipment less cost-effective and more time-consuming than it could be, the additional hardware, such as camming sleeves or rings and the gaskets required to seal the flow meter between the pipe ends, can easily be ineffectively installed or inadvertently discarded.

SUMMARY

A process instrument having a wafer-style body for mounting between an upstream flanged pipe and a downstream flanged pipe has a flow passage, a transmitter connected to the body, and first and second end plates fixed to the body. The first end plate has a first set of cams for engaging a plurality of threaded fasteners extending between the upstream flanged pipe and the downstream flanged pipe. The second end plate has a second set of cams for engaging the plurality of threaded fasteners such that the first set of cams and the second set of cams center the flow passage with respect to the upstream flanged pipe and the downstream flanged pipe.

A method of centering a wafer-style body of a process instrument between an upstream flanged pipe and a downstream flanged pipe includes inserting a plurality of threaded fasteners into a plurality of corresponding holes in the upstream flanged pipe and the downstream flanged pipe, and positioning the wafer-style body of the process instrument between the upstream flanged pipe and the downstream flanged pipe such that a first set of cams on a first endplate fixed to an upstream end of the wafer-style body and a second set of cams on a second endplate fixed to a downstream end of the wafer-style body engage the plurality of threaded fasteners.

DETAILED DESCRIPTION

Figure 1A:
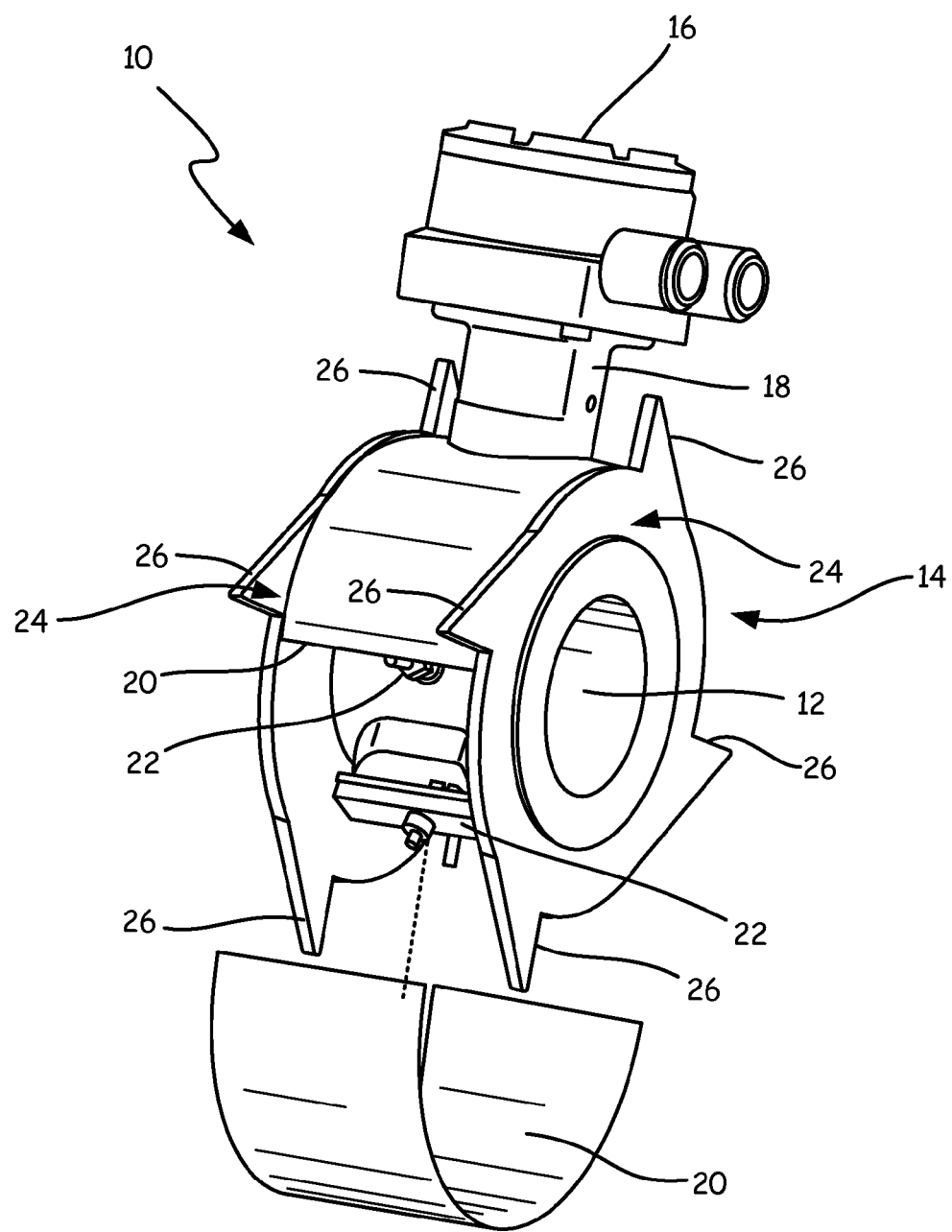
FIG. 1A is an exploded view of a wafer-style flow meter.
Figure 1B:
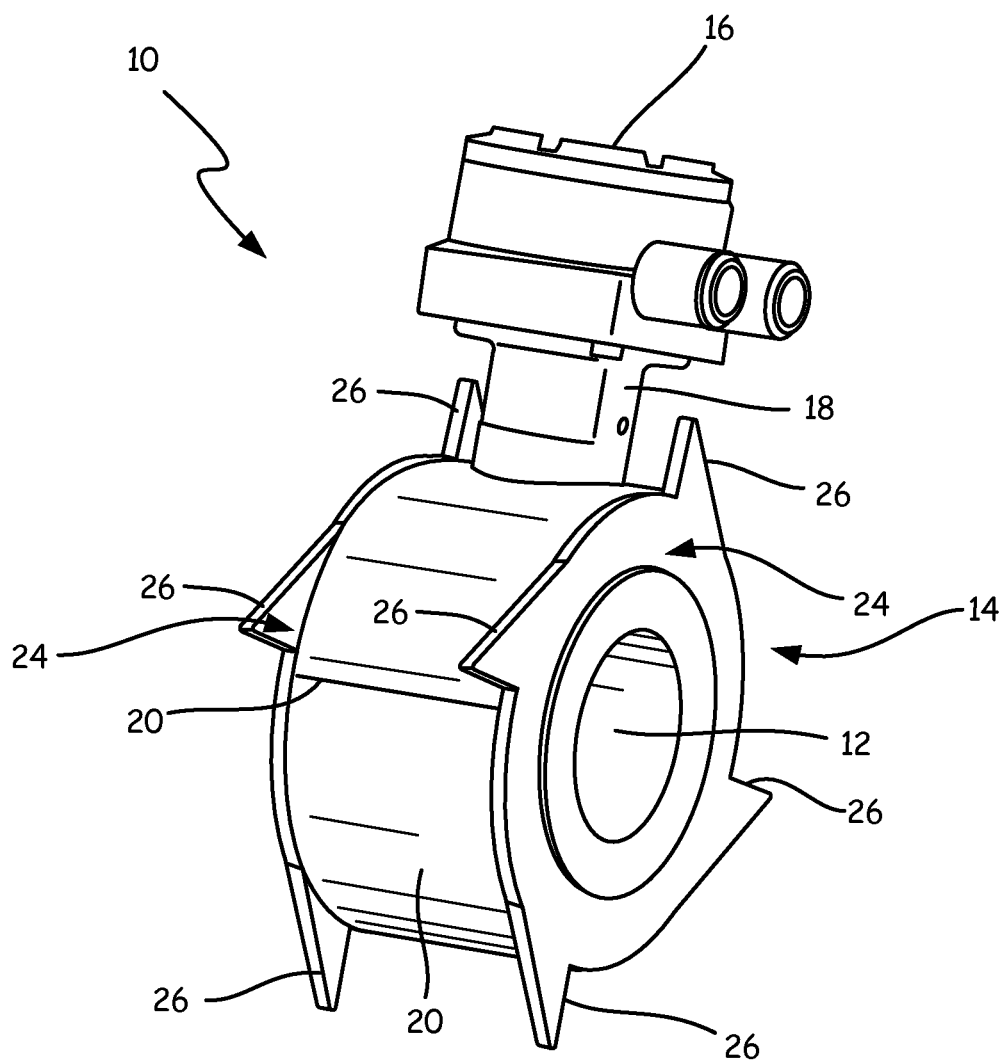
FIG. 1B is a perspective view of the wafer-style flow meter of FIG. 1A.

FIG. 1A is an exploded view of wafer-style process instrument (flow meter) 10, and FIG. 1B is a perspective view of wafer-style flow meter 10. Flow meter 10 includes meter flow passage 12, flow meter body (or flow tube) 14, transmitter (or remote junction box) 16, neck 18, wrappers 20, electrical components 22, end plates 24, and cams 26. In the embodiment shown in FIGS. 1A-1B, flow meter 10 is a magnetic flow meter. In other embodiments, flow meter 10 can be any type of flow meter, including but not limited to other velocity flow meters, positive displacement flow meters, and mass flow meters. In other embodiments, flow meter 10 can be any type of process instrument that uses a wafer-style mounted in a pipe line.

Meter flow passage 12 forms a tube for directing flow through flow meter body 14. Transmitter 16 is connected to flow meter body 14 by neck 18. Wrappers 20 are two arcuate halves joined together to form the outer cylinder or housing of flow meter body 14. Electrical components 22 (such as field coils and electrodes) can be connected as appropriate to meter flow passage 12, and can be housed within the cylinder formed by wrappers 20. End plates 24 are joined to each end of the cylinder formed by wrappers 20. End plates 24 have a series of evenly-spaced cams 26 extending radially outward from flow meter body 14. Cams 26 can be arcuate and gradually increase in size as they extend outward from flow meter body 14 to produce a desired angle (discussed further in FIGS. 3-4).

Flow meter 10 can be assembled by welding wrappers 20 together around meter flow passage 12 to form flow meter body 14. Transmitter 16 can be connected to flow meter body 14 by neck 18, which can be flexible to allow for repositioning of transmitter 16 (discussed further in FIG. 5). End plates 24 can then be welded to either side of the cylinder of flow meter body 14. In this manner, the components of flow meter 10 can be cut from the same material and welded into a single, leak-proof housing for electrical components 22 of flow meter 10. Further, flow meter body 14 and end plates 24 can be cut to various sizes and shapes to accommodate pipe lines having different sizes and bolt hole patterns.

Figure 2A:
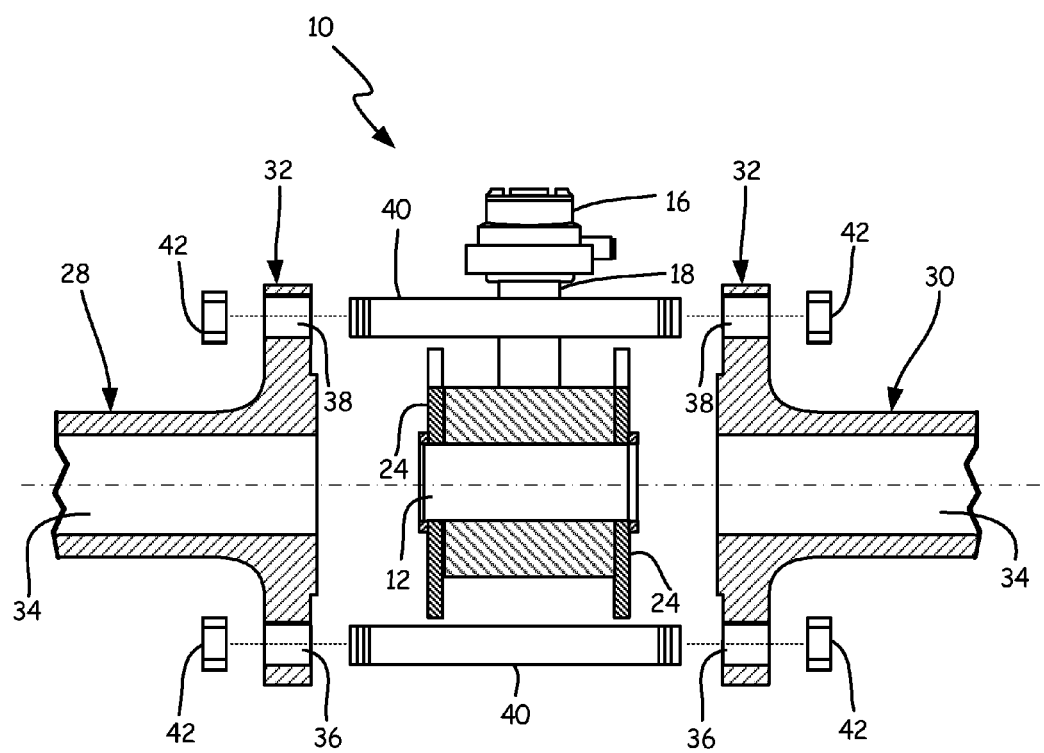
FIG. 2A is a plan view of a wafer-style flow meter positioned between an upstream flanged pipe and a downstream flanged pipe.
Figure 2B:
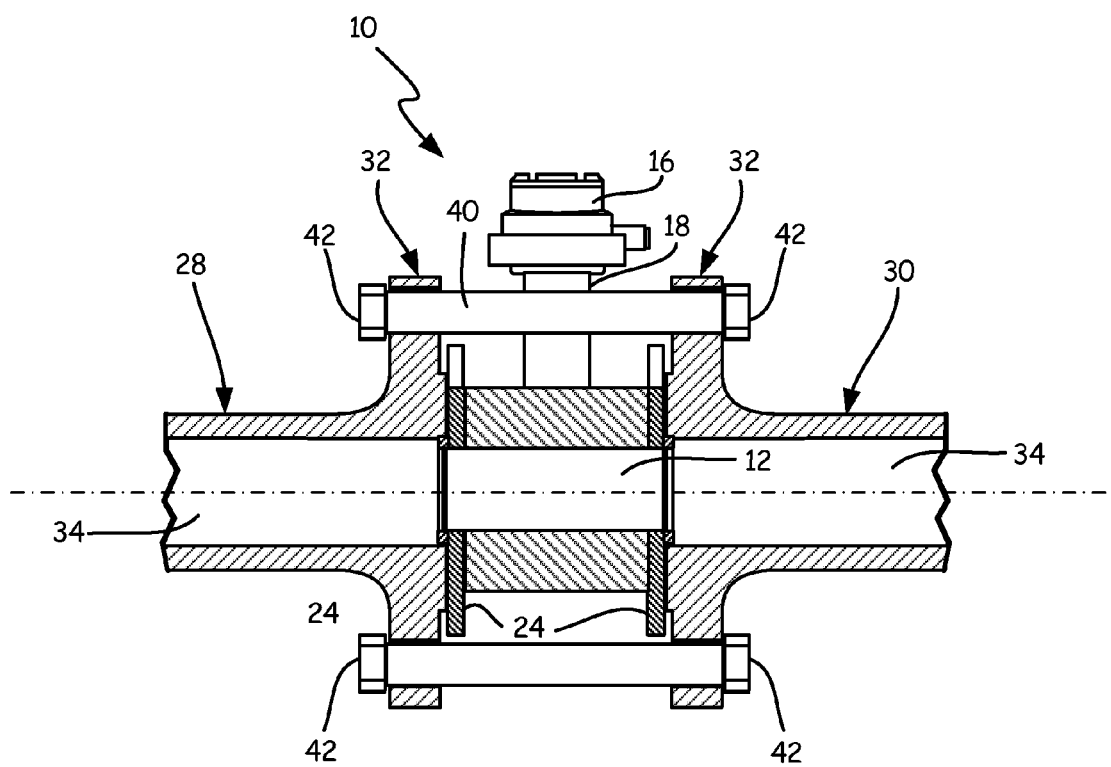
FIG. 2B is a plan view of the wafer-style flow meter of FIG. 2A installed between an upstream flanged pipe and a downstream flanged pipe.

FIG. 2A is a plan view of wafer-style flow meter 10 positioned between upstream flanged pipe 28 and downstream flanged pipe 30. FIG. 2B is a plan view of wafer-style flow meter 10 installed between upstream flanged pipe 28 and downstream flanged pipe 30. Upstream flanged pipe 28 and downstream flanged pipe 30 include flanges 32 and pipe flow passages 34. Flanges 32 include lower holes 36 and upper holes 38 for receiving threaded fasteners 40, which are threaded to receive nuts 42. For simplicity, only one upper hole 36 and one lower hole 38 are shown on each flange 32 in FIGS. 2A-2B. Flanges 32 can have any number of lower holes 36 and upper holes 38. Threaded fasteners 38 span the distance between upstream flanged pipe 28 and downstream flanged pipe 30 and, together with nuts 42, hold flow meter 10 securely in place.

Threaded fasteners 40 can be placed in lower holes 36 and fastened by nuts 42 to form a preliminary connection between upstream flanged pipe 28 and downstream flanged pipe 30. Flow meter 10 can then be installed between upstream flanged pipe 28 and downstream flanged pipe 30 such that end plates 24 are flush with flanges 32. Threaded fasteners 40 can then be placed in upper holes 38 and fastened by nuts 42. Nuts 42 can be tightened such that flow meter 10 is suspended between upstream flanged pipe 28 and downstream flanged pipe 30 while still allowing flow meter 10 to be rotated to a desired position to align meter flow passage 12 with pipe flow passages 34 (described further in FIGS. 3-4). After flow meter 10 has been rotated into the desired position, nuts 42 can be tightened, securing flow meter 10 between upstream flanged pipe 28 and downstream flanged pipe 30 and forming a leak-proof seal between end plates 24 and flanges 32. Neck 18 can be made adjustable such that transmitter 16 is readable as necessary following rotation of flow meter 10. In this manner, installation of flow meter 10 involves utilizing existing hardware to align meter flow passage 12 and pipe flow passages 34 and creating a leak-proof seal between flow meter 10 and flanges 32, eliminating the need for additional hardware.

Figure 3A:
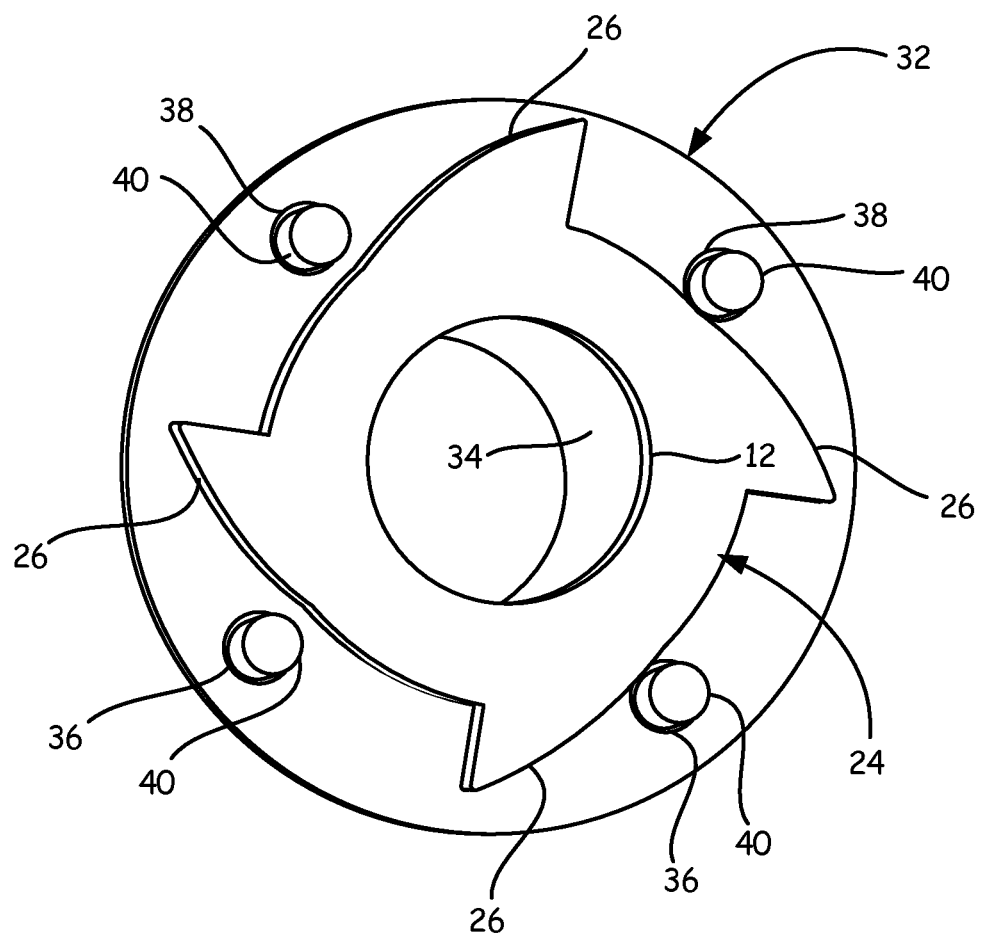
FIG. 3A is a perspective view of an end plate of a wafer-style flow meter aligned with a pipe flange having four holes and a plurality of threaded fasteners in loose positions.
Figure 3B:
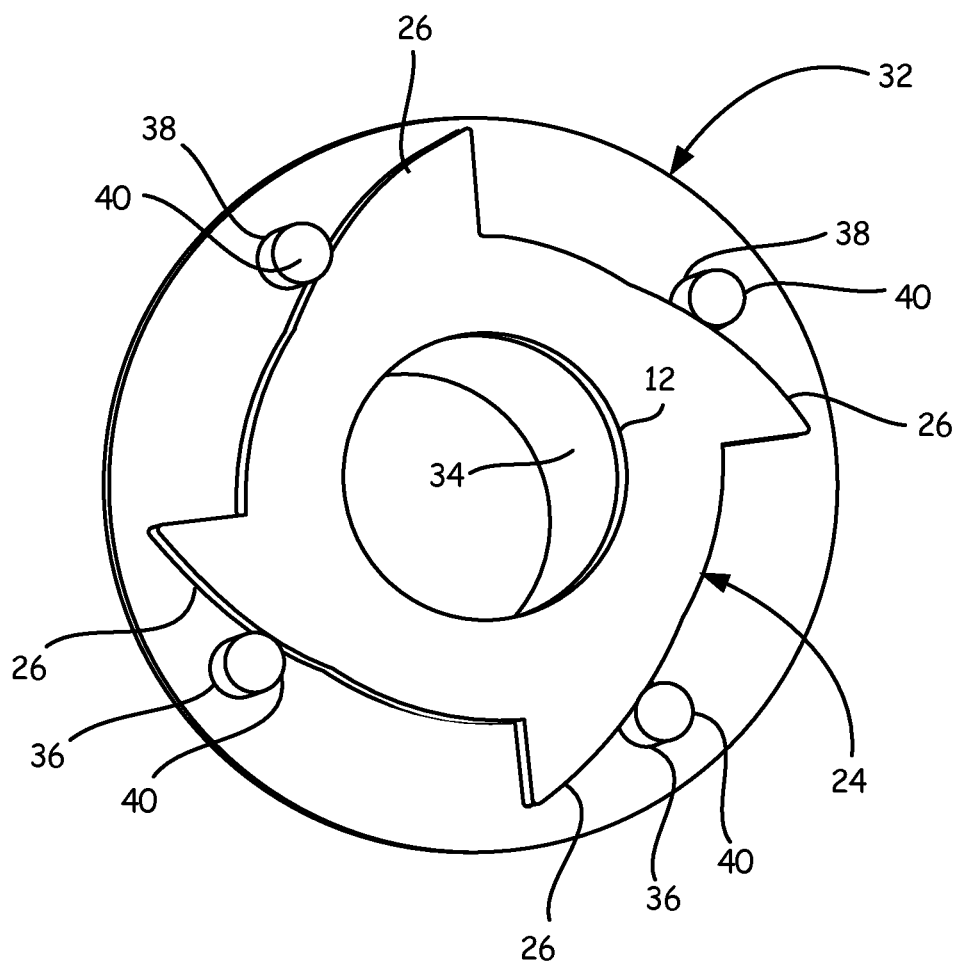
FIG. 3B is a perspective view of the end plate aligned with a pipe flange of FIG. 3A with the threaded fasteners in outer limit positions.
Figure 4A:
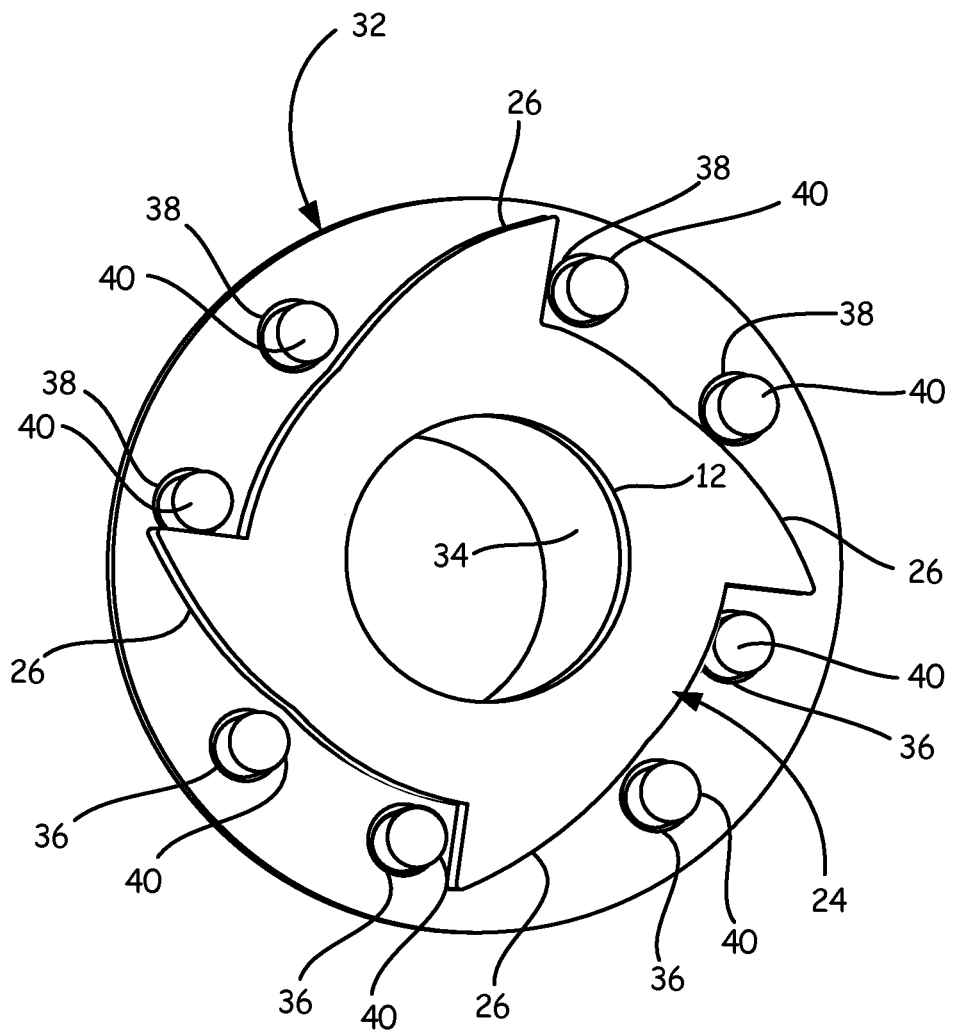
FIG. 4A is a perspective view of an end plate of a wafer-style flow meter aligned with a pipe flange having eight holes and a plurality of threaded fasteners in loose positions.
Figure 4B:
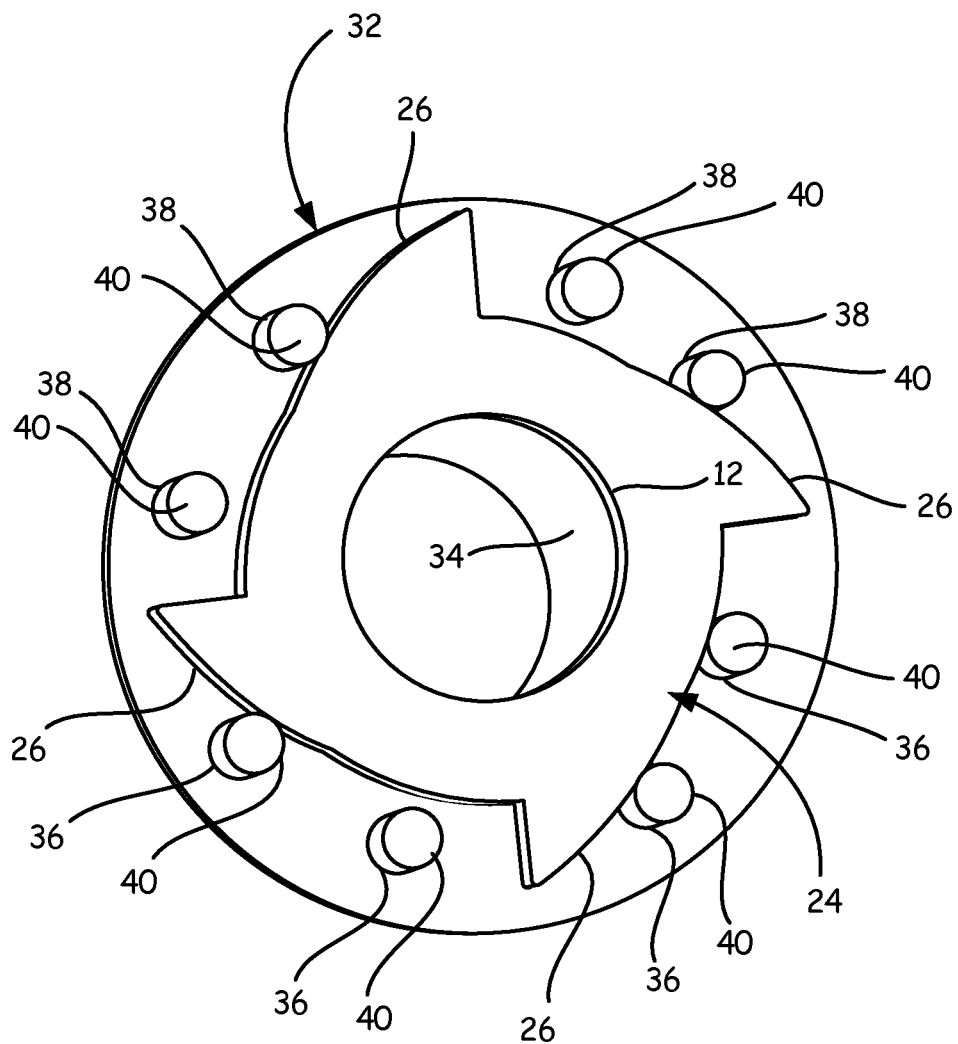
FIG. 4B is a perspective view of the end plate aligned with a pipe flange of FIG. 4A with the threaded fasteners in outer limit positions.

FIGS. 3-4 illustrate the compatibility of the present invention with a variety of flange bolt hole patterns. For simplicity, a single end plate 24 of flow meter 10 is shown with flange 32. FIG. 3A is a perspective view of an end plate of a wafer-style flow meter aligned with a pipe flange having four holes and a plurality of threaded fasteners in loose positions. FIG. 3B is a perspective view of the end plate aligned with a pipe flange of FIG. 3A with the threaded fasteners in outer limit positions. FIG. 4A is a perspective view of an end plate of a wafer-style flow meter aligned with a pipe flange having eight holes and a plurality of threaded fasteners in loose positions. FIG. 4B is a perspective view of the end plate aligned with a pipe flange of FIG. 4A with the threaded fasteners in outer limit positions.

Flange 32 has lower holes 36 and upper holes 38. In the embodiment shown in FIG. 3, flange 32 has two lower holes 36 and two upper holes 38. In the embodiment shown in FIG. 4, flange 32 has four lower holes 36 and four upper holes 38. In other embodiments, flange 32 may have any number of lower holes 36 and upper holes 38. End plate 24 has equally spaced cams 26 extending radially outward.

In FIG. 3A and FIG. 4A, threaded fasteners 40 are loosely held in lower holes 36 and upper holes 38 of flange 32. Lower holes 36 and upper holes 38 are sized such that threaded fasteners 40 are given limited play when initially installed to facilitate connection of pipe flanges 32 on either side of flow meter 10. In FIG. 3B and FIG. 4B, threaded fasteners 40 are pushed to the outer limit of lower holes 36 and upper holes 38 of flange 32.

When flow meter 10 is rotated, cams 26 of end plate 24 engage threaded fasteners 40. The arcuate surface of cams 26 push against threaded fasteners 40 such that flow meter 10 can rotate until threaded fasteners 40 reach the outer limit of lower holes 36 and upper holes 38 of flange 32. The arcuate surface of cams 26 can extend radially outward from end plate 24 in a variety of angles. The angle required can differ based on the number of lower holes 36 and upper holes 38 of flange 32. In this manner, a variety of end plates 24 having cams 26 extending radially outward at different angles can be joined to flow meter 10 depending on the bolt hole pattern of flanges 32. Cams 26 can thus enable rotation of flow meter 10 until threaded fasteners 40 are pushed to the outer limit position and meter flow passage 12 is aligned with pipe flow passage 34.

Figure 5A:
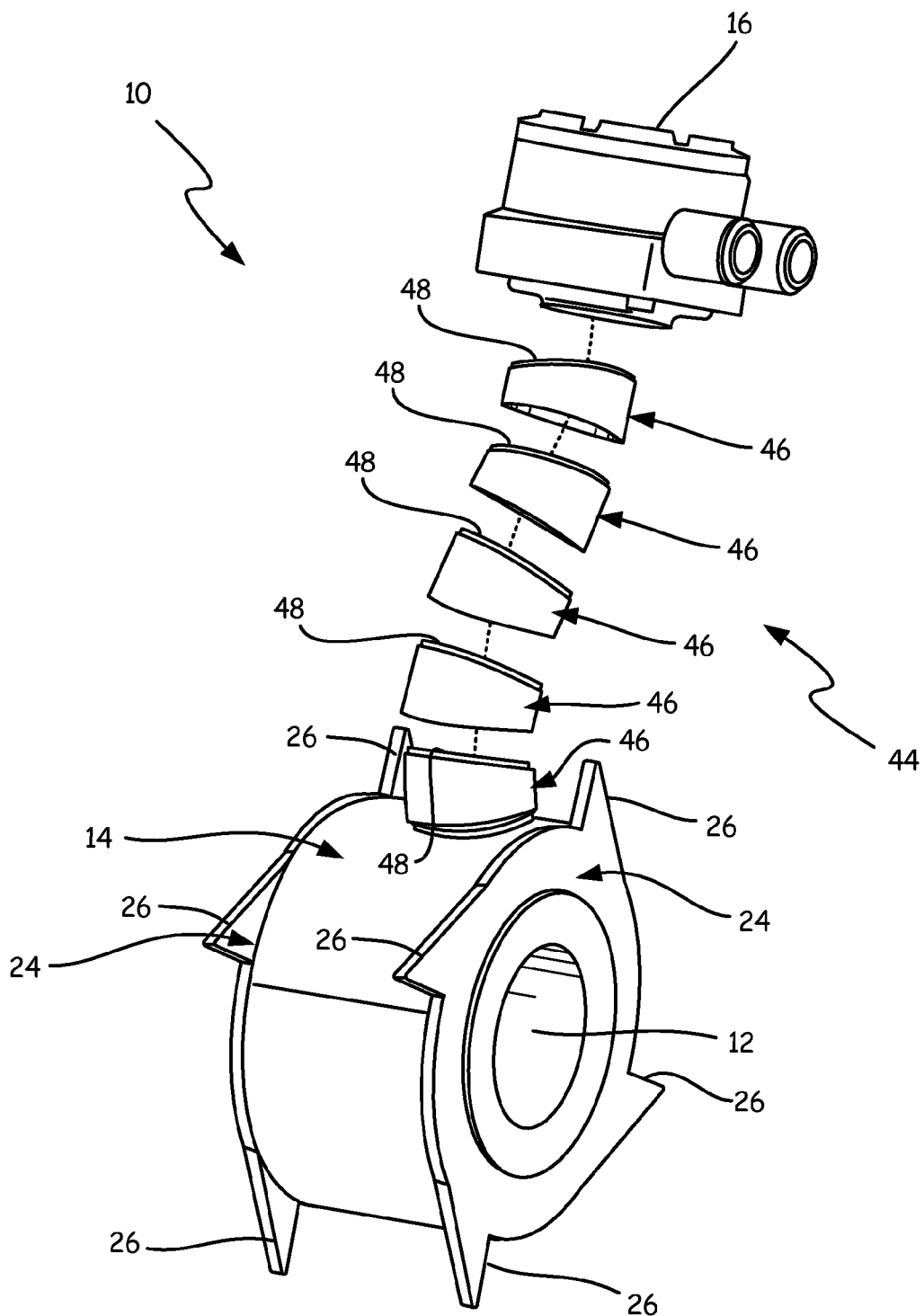
FIG. 5A is an exploded view of a flexible neck attached between a wafer-style flow tube and a transmitter housing of a magnetic flow meter.
Figure 5B:
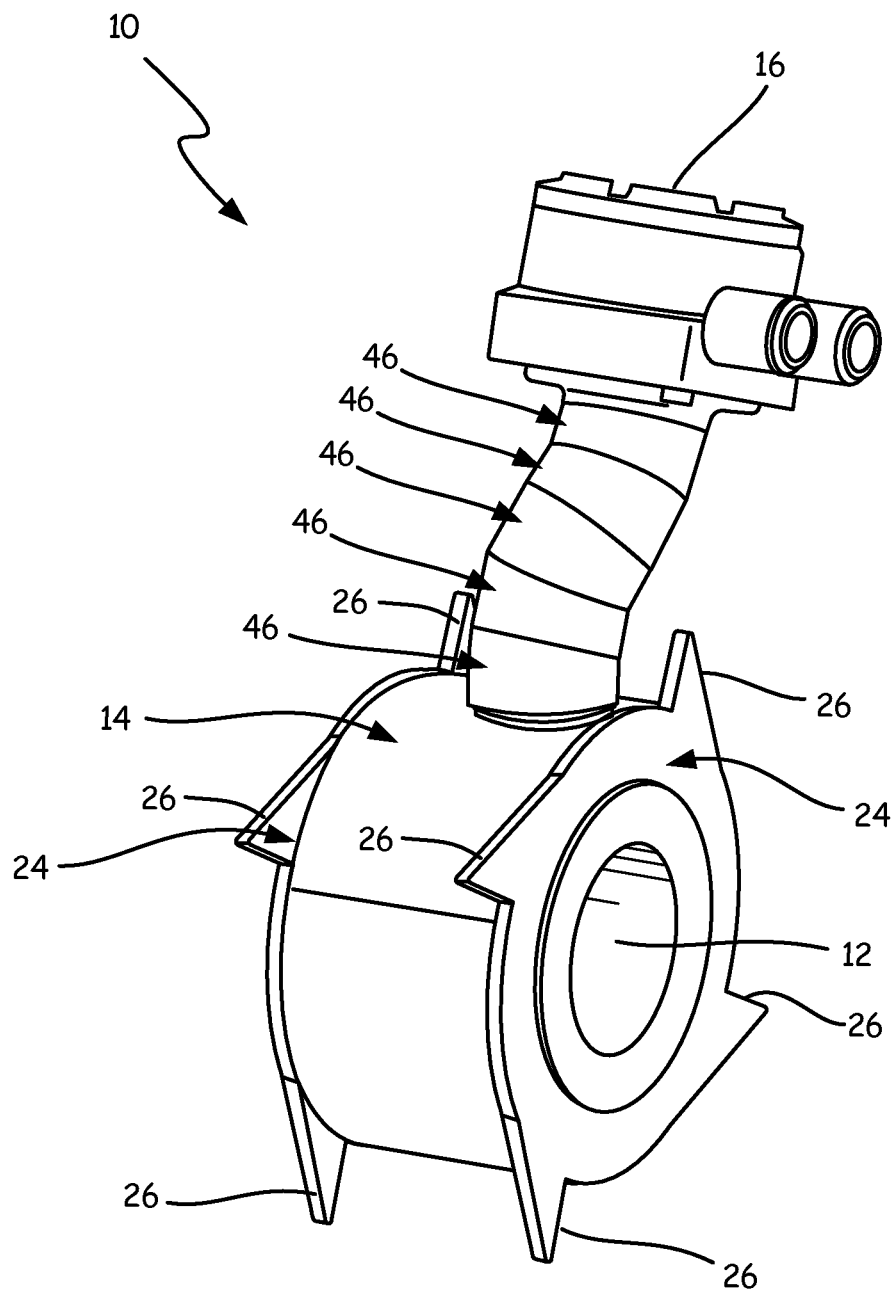
FIG. 5B is a perspective view of the flow meter of FIG. 5A.

FIG. 5A is an exploded view of flexible neck 44 attached to wafer-style flow meter 10, and FIG. 5B is a perspective view of flexible neck 44. Flexible neck 44 includes rotatable segments 46. Rotatable segments 46 include ridges 48 for sealable engagement with other rotatable segments 46 or transmitter 16.

Flexible neck 44 extends from flow meter body 14 of flow meter 10, connecting the housing of transmitter 16 to flow meter body 14. Electrical connections between flow meter body 14 and transmitter 16 are made by wires (not shown) that extend through flexible neck 44. Flexible neck 44 can have any number of rotatable segments 46 to achieve the desired length and flexibility. Each rotatable segment 46 has a ridge 48 at one end that connects it to other rotatable segments 46. Rotatable segments 46 can be generally cylindrical with one side being shorter than the other. Thus, when rotatable segments 46 are twisted, flexible neck 44 can be twisted into any number of positions. In this manner, transmitter 16 can be repositioned to an optimal orientation after meter flow passage 12 has been aligned with pipe flow passages 34 via the rotation of flow meter body 14 end plates 24 having cams 26.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process instrument comprising:
   a wafer-style body for mounting between an upstream flanged pipe and a downstream flanged pipe, the body having a flow passage;
   a transmitter connected to the process instrument body for measuring a parameter of a process fluid flowing through the flow passage;
   a first end plate fixed to the body, the first endplate having a first set of cams for engaging a plurality of threaded fasteners extending between the upstream flanged pipe and the downstream flanged pipe; and
   a second end plate fixed to the body, the second endplate having a second set of cams for engaging the plurality of threaded fasteners, wherein engagement of the first set of cams and the second set of cams with the plurality of threaded fasteners centers the flow passage with respect to the upstream flanged pipe and the downstream flanged pipe.

2. The process instrument of claim 1, wherein the first set of cams and the second set of cams each have a number of camming surfaces, the number of camming surfaces of the first set of cams being equal to the number of camming surfaces of the second set of cams.

3. The process instrument of claim 2, wherein the first set of cams and the second set of cams are aligned.

4. The process instrument of claim 3, wherein the number of camming surfaces comprises at least four camming surfaces.

5. The process instrument of claim 4, wherein each of the at least four camming surfaces extend from the flow meter body at an arcuate angle.

6. The process instrument of claim 5, wherein the at least four camming surfaces tangentially engage an equal number of the plurality of threaded fasteners in order to force the equal number of threaded fasteners to an outer limit within a plurality of corresponding holes, the plurality of corresponding holes being located on an upstream pipe flange and a downstream pipe flange.

7. The process instrument of claim 1, wherein the transmitter is joined to the body by a repositionable neck.

8. The process instrument of claim 7, wherein the repositionable neck comprises a series of rotatable segments, the rotatable segments comprising male and female ends to facilitate leak-proof rotation.

9. The process instrument of claim 1, wherein the process instrument is a flow meter.

10. The process instrument of claim 9, wherein the body comprises a flow tube of a magnetic flow meter.

11. A method of centering a wafer-style body of a process instrument between an upstream flanged pipe and a downstream flanged pipe, the method comprising:
    inserting a plurality of threaded fasteners into a plurality of corresponding holes in the upstream flanged pipe and the downstream flanged pipe; and
    positioning the wafer-style body of the process instrument between the upstream flanged pipe and the downstream flanged pipe such that a first set of cams
       on a first endplate fixed to an upstream end of the wafer-style body and a second set of cams on a second endplate fixed to a downstream end of the wafer-style body engage the plurality of threaded fasteners.

12. The method of centering a wafer-style body of a process instrument of claim 11, wherein inserting the plurality of threaded fasteners into the plurality of corresponding holes comprises a first stage and a second stage, the first stage being completed before installing the wafer-style flow meter between the upstream flanged pipe and the downstream flanged pipe and the second stage being completed after installing the wafer-style body between the upstream flanged pipe and the downstream flanged pipe.

13. The method of centering a wafer-style body of a process instrument of claim 12, wherein the first stage comprises inserting at least two of the plurality of threaded fasteners in a plurality of lower hole positions and the second stage comprises inserting at least two of the plurality of threaded fasteners in a plurality of upper hole positions.

14. The method of centering a wafer-style body of a process instrument of claim 11, wherein positioning the wafer-style body comprises rotating the wafer-style body such that the first set of cams and the second set of cams force the plurality of threaded fasteners to an outer limit within the plurality of corresponding holes.

15. The method of centering a wafer-style body of a process instrument of claim 11, and further comprising adjusting a repositionable neck joining a transmitter to the wafer-style body to thereby adjust orientation of the transmitter.

* * * * *